United States Patent
Coffin

(10) Patent No.: US 7,337,601 B1
(45) Date of Patent: Mar. 4, 2008

(54) GRASS GROOMER WITH INTEGRATED BRUSH FOR REEL CUTTING UNIT

(75) Inventor: Scott M. Coffin, Plymouth, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 11/218,288

(22) Filed: Sep. 1, 2005

(51) Int. Cl.
*A01D 34/00* (2006.01)

(52) U.S. Cl. .......................................... 56/249; 56/294
(58) Field of Classification Search ...................... 56/7, 56/16.4 A–16.4 C, 156, 249, 294, DIG. 9, 56/DIG. 20, 17.3
See application file for complete search history.

(56) References Cited

U.S. PATENT DOCUMENTS

| 3,331,195 | A | * | 7/1967 | Heth et al. .................... 56/13.1 |
| 4,494,365 | A | | 1/1985 | Lloyd |
| 4,878,340 | A | | 11/1989 | Roy et al. |
| 5,375,399 | A | * | 12/1994 | Kraft .......................... 56/16.7 |
| 6,098,387 | A | * | 8/2000 | Pfisterer .................. 56/16.4 R |
| 6,688,094 | B2 | | 2/2004 | Coffin et al. |
| 7,213,390 | B2 | * | 5/2007 | Fischier et al. ............... 56/294 |

* cited by examiner

Primary Examiner—Thomas B. Will
Assistant Examiner—Mai T Nguyen
(74) Attorney, Agent, or Firm—James W. Miller

(57) ABSTRACT

A grass groomer for a reel cutting unit of a mower comprises a grooming reel that rotates about a substantially horizontal axis. The grooming reel has a plurality of helical blade tip flights with the blade tips in each flight acting sufficiently against the turf to cut horizontal grass runners and to dethatch the turf. The helical blade tip flights are spaced from one another around a circumference of the grooming reel. The grooming reel also carries a plurality of helical brushes that are also spaced from one another around the circumference of the grooming reel, the helical brushes being disposed between the helical blade tip flights. The helical brushes are disposed to rotate with the grooming grass and to ruffle and wipe the grass in the turf simultaneously with the rotation of the grooming reel.

17 Claims, 3 Drawing Sheets

GRASS GROOMER WITH INTEGRATED BRUSH FOR REEL CUTTING UNIT

TECHNICAL FIELD

This invention relates to mowers having reel cutting units in which a rotatable cutting reel sweeps grass against a bedknife to cut the grass. More particularly, this invention relates to a grass groomer placed in advance of the cutting reel of a reel cutting unit.

BACKGROUND OF THE INVENTION

Reel cutting units are well known for use on greens mowers, fairway mowers and other mowers designed for precision grass cutting on golf courses and the like. Each cutting unit has a frame that mounts a rotatable cutting reel which sweeps grass against a sharpened bedknife to cut the grass. Front and rear rollers carried on the frame allow the cutting unit to roll over the ground. The cutting unit is linked to the mower and is propelled by the motion of the mower itself.

A grass groomer is an accessory that is often used on a reel cutting unit between the front roller and the cutting reel. The grass groomer comprises a rotatable grooming reel formed by a series of laterally spaced, toothed blades. The tips of the blades are offset relative to one another to form helical flights of blade tips that extend along the length of the grooming reel. The blade tips extend down into the grass below the height of cut.

As the grass groomer rotates during operation of the reel cutting unit, the blade tips cut horizontal grass growth called stolons. Cutting stolons produces new roots and tillers from the nodes, leading to healthier turf. The plants reaction to grooming is to develop a new growing point at the crown.

In addition, the blade tips pull up and remove thatch. The material cut and brought up by the groomer is then recut by the action of the cutting reel against the bedknife and is discharged from the cutting unit along with the rest of the grass clippings. It is well known that the use of a grass groomer to cut horizontal growth and to remove thatch improves the health of the turf and promotes the growth of the grass.

Because the grooming reel is made from a plurality of laterally spaced blades, the grass groomer acts on the turf at a plurality of laterally spaced, disconnected contact points along the length of the groomer. Each contact point is represented by the point where one blade contacts the turf. The blade tips will pull up and remove some of the material, particularly the horizontal growth, that lies between the contacts points of adjacent blades. However, some material lying between the contact points may be missed and not removed. Accordingly, there is a need in the art for a grass groomer that acts on the turf more uniformly in the areas lying between the contact points of the laterally spaced groomer blades.

SUMMARY OF THE INVENTION

One aspect of this invention relates to a grass groomer for use on a reel cutting unit of a mower. The reel cutting unit has a cutting reel and a bedknife for cutting grass. The grass groomer is used on the reel cutting unit in advance of the cutting reel with reference to a forward direction of movement of the mower. The grass groomer comprises a grooming reel having a plurality of laterally spaced, toothed blades. The grooming reel is mountable on the reel cutting unit for rotation about a substantially horizontal axis thereon to allow the blades to groom the turf by cutting horizontal grass growth and by pulling up thatch during rotation of the grooming reel. At least one grass engaging brush is fixed to the grooming reel during operation of the grooming reel to rotate with the grooming reel.

Another aspect of this invention relates to a grass groomer for use on a reel cutting unit of a mower. The reel cutting unit has a cutting reel and a bedknife for cutting grass. The grass groomer is used on the reel cutting unit in advance of the cutting reel with reference to a forward direction of movement of the mower. The grass groomer comprises a grooming reel comprising a plurality of laterally spaced blades each of which has a plurality of generally radial, circumferentially spaced teeth. The blade teeth each have a leading edge, a blade tip, and a trailing edge taken with reference to a direction of rotation of the grooming reel. The teeth are adapted to groom the turf as the reel cutting unit passes over the turf and the grooming reel is rotated. Each blade has at least one radially outwardly facing seat located thereon between the leading edge of one tooth and the trailing edge of a preceding adjacent tooth. A brush comprises a base for holding brush bristles. The base of the brush is sized to be received in the seats in a plurality of the blades such that the brush has a length that is long enough to span across a plurality of the laterally spaced blades forming the grooming reel. The brush bristles extend radially outwardly between the leading and trailing teeth edges that are on either side of the blade seats in which the base is received.

Yet another aspect of this invention relates to a grass groomer for a reel cutting unit of a mower. The grass groomer comprises a grooming reel that rotates about a substantially horizontal axis. The grooming reel has a plurality of helical blade tip flights with the blade tips in each flight acting sufficiently against the turf to cut horizontal grass growth and to dethatch the turf. The helical blade tip flights are spaced from one another around a circumference of the grooming reel. The grooming reel also carries a plurality of helical brushes that are also spaced from one another around the circumference of the grooming reel, the helical brushes being disposed between the helical blade tip flights. The helical brushes are disposed to rotate with the grooming grass and to ruffle and wipe the grass in the turf simultaneously with the rotation of the grooming reel.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
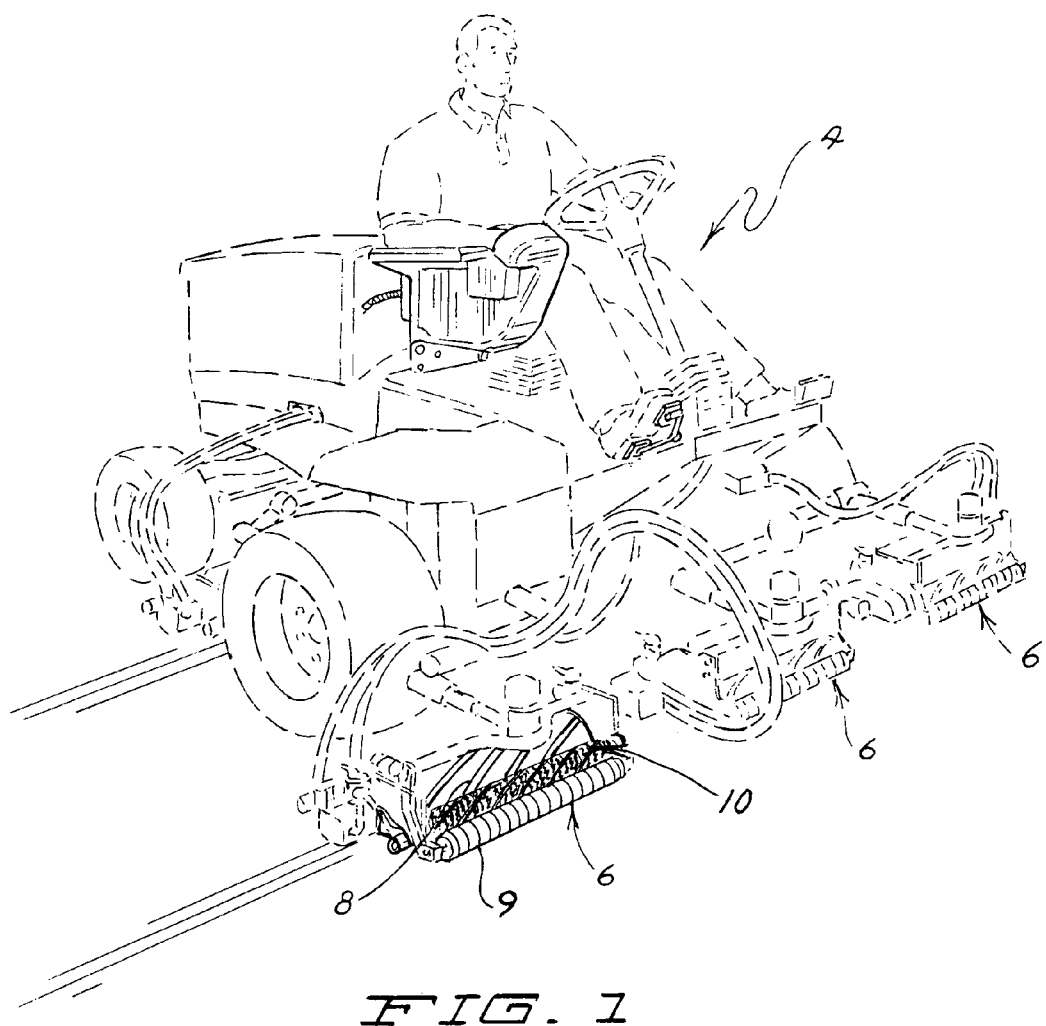
FIG. 1 is a perspective view of a mower having a plurality of reel cutting units with which the grass groomer of this invention may be used.

FIG. 1 shows a mower 4 having a plurality of reel cutting units 6 for mowing grass. Each reel cutting unit 6 includes a transversely arranged rotatable cutting reel 8 that sweeps grass against a sharpened bedknife (not shown) to sever the same. Reel cutting unit 6 is well known in the mowing art and need not be further described.

Grass groomer 2 of this invention comprises a grooming reel 10. Grooming reel 10 comprises a horizontal shaft 12 that is rotatably carried on reel cutting unit 6 between cutting reel 8 and a front roller 9. A set or series of blades 14 is stacked along the length of shaft 12 with adjacent blades 14 being laterally spaced or separated from one another by cylindrical spacers 16. When a sufficient number of blades 14 and spacers 16 have been assembled along shaft 12 to make a grooming reel 10 of sufficient length, end caps 18 may be threaded onto shaft 12 to hold the array of blades 14 and spacers 16 tightly on shaft 12.

Each blade 14 is star-shaped having a plurality of circumferentially spaced, radially outwardly extending teeth 20. Each tooth 20 has a leading edge 22, a tip 24, and a trailing edge 26 taken with respect to the usual direction of rotation of grooming reel 10 as shown by arrow A in FIG. 3. The leading and trailing edges 22 and 26 and tip 24 of each tooth 20 could be sharpened or blunt. The number of teeth 20 on each blade 14 can obviously vary although each blade 14 has at least one tooth 20.

Each blade 14 has a hexagonal bore 28 in the center thereof which non-rotatably mates with a hexagonal central section 30 of shaft 12. Different blades 14 have their hexagonal bores 28 offset relative to one another in a predetermined number of different index positions. Thus, when these blades 14 are stacked consecutively on central section 30 of shaft 12 beginning with a blade having the first index position through a blade having the last index position and then repeating, tips 24 of adjacent teeth 20 will be circumferentially offset relative to one another. Thus, corresponding teeth 20 on blades 14 will have their tips 24 disposed in a helical flight 32 that winds a number of turns around shaft 12. Since blades 14 have a plurality of teeth 20, a plurality of helical blade tip flights 32 will be formed around shaft 12 corresponding to the number of teeth 20, i.e. with five teeth 20 as shown there will be five helical blade tip flights 32.

Figure 3:
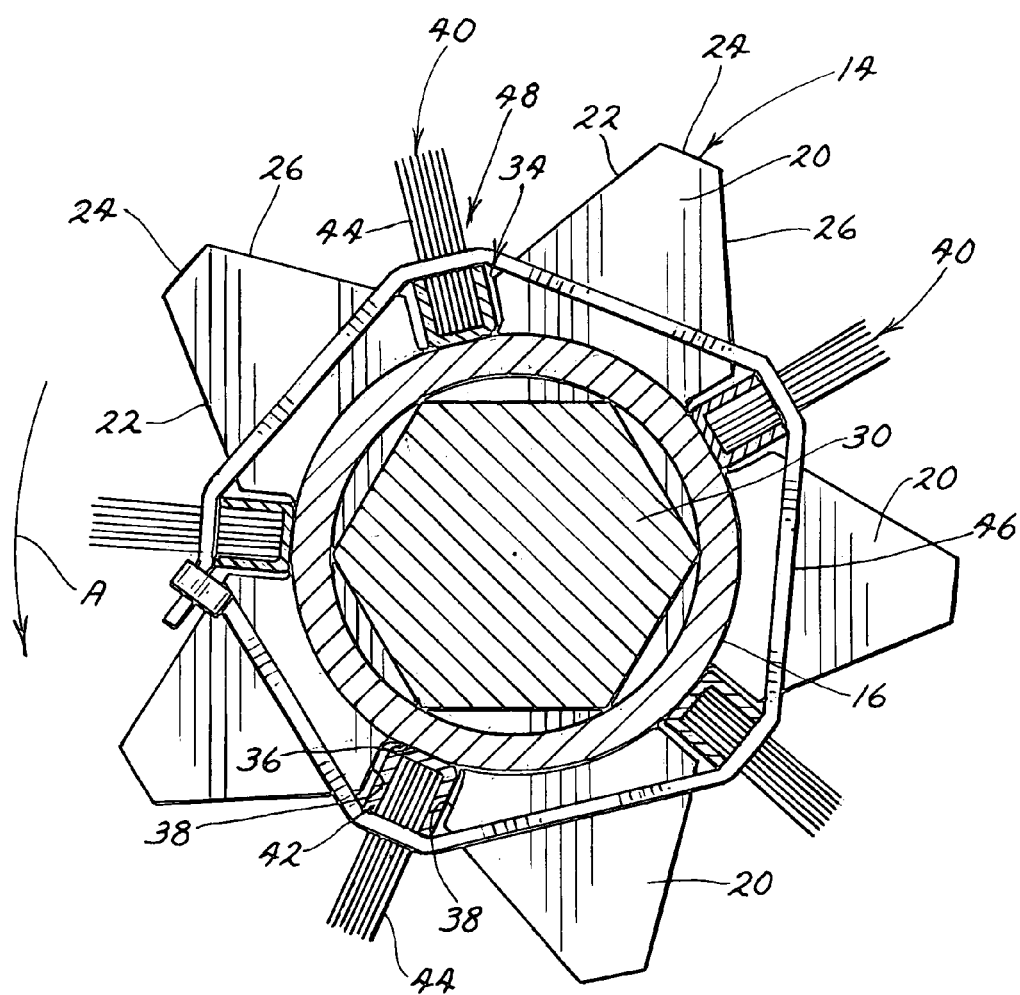
FIG. 3 is a cross-sectional view of the grass groomer shown in FIG. 2, particularly illustrating the brushes located between the teeth of a blade of the grooming reel.

Each blade 14 also has a plurality of outwardly facing brush receiving seats 34. Seats 34 are located between the leading and trailing edges of adjacent teeth 20. As shown in FIG. 3, each seat 34 is U-shaped having a bottom 36 and opposed sides 38. The midpoint of bottom 36 of each seat 34 lies generally along the outer diameter of spacers 16. Like the helical blade tip flights 32 themselves, seats 34 will also be disposed in helical flights extending along the length of grooming reel 10 as blades 14 are consecutively stacked on shaft 12 in their circumferentially offset positions.

A replaceable helical brush 40 is removably received in each helical flight of seats 34. Brush 40 comprises a channel shaped base 42 having a flight of brush bristles 44 disposed therein. Base 42 of brush 40 is flexible enough to allow brush 40 to be installed in a helical flight of seats 34 by dropping one side of base 42 into one end of the helical flight of seats 34 and by then twisting and manipulating base 42 around blades 14 to drop the rest of base 42 into the remaining seats 34 in the helical flight. Other brushes 40 can be installed in other flights of seats 34 in the same manner. Once a brush 40 is received in a flight of seats, the base 42 of each brush 40 will rest against the bottom 36 of each seat 34 and along the outer diameters of spacers 16 as shown in FIG. 3.

Figure 2:
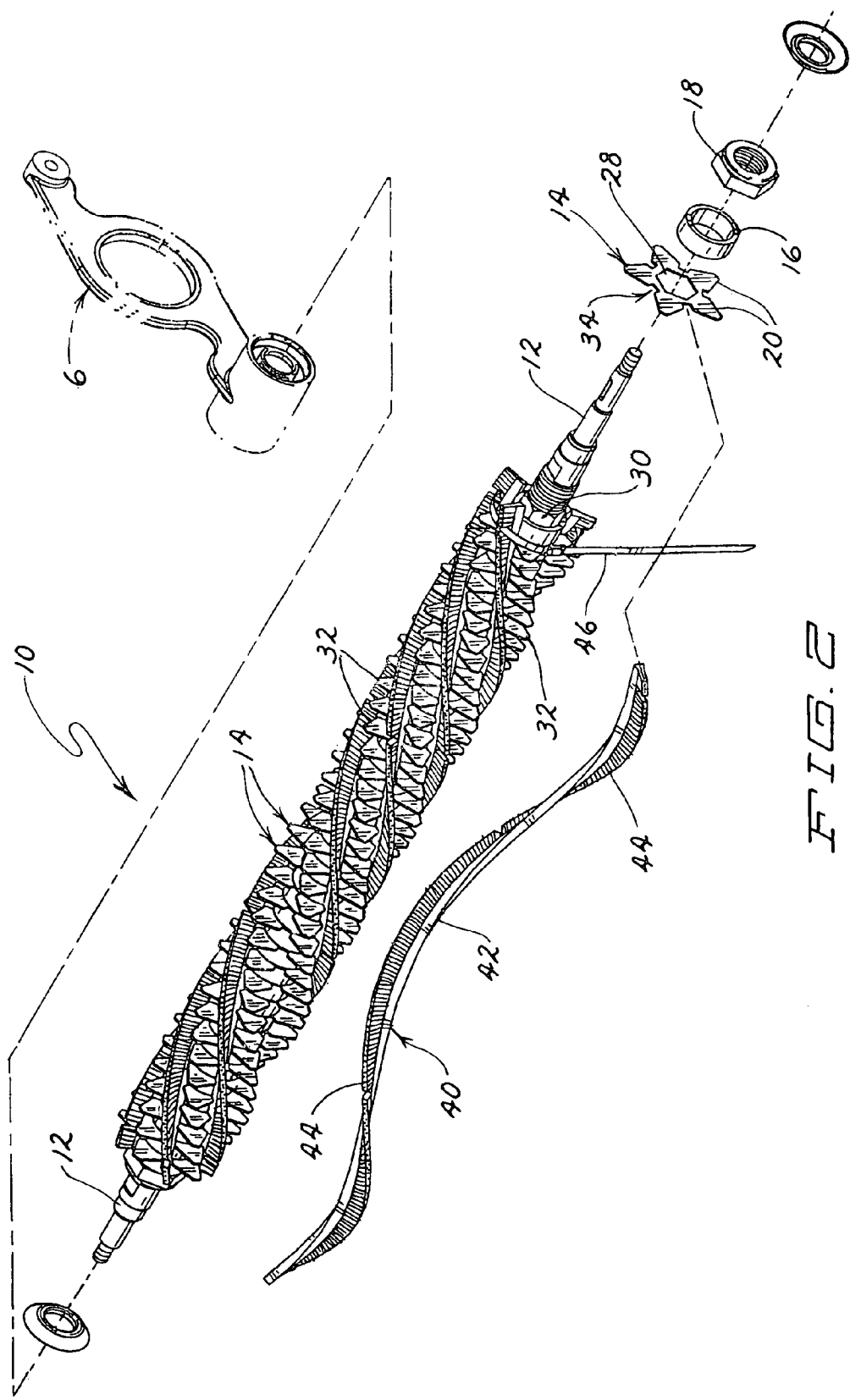
FIG. 2 is a perspective view of a grass groomer according to this invention, particularly illustrating one blade and one brush of the groomer in exploded form.

Brushes 40 can be retained within seats 34 in any desirable way. One way is to use a plurality of flexible, cinchable ties 46 to tie brushes 40 onto grooming reel 10. One such tie 46 is shown in FIGS. 2 and 3. Bristles 44 could be notched, as shown at 48, to allow a tie 46 to pass down through bristles 44 without deforming bristles 44 to rest tightly against the top of base 42. When a particular tie 46 is cinched shut, tie 46 will press radially inwardly on the bases 42 of all the helical brushes 40 to clamp brushes 40 tightly against seats 34 in blades 14. See FIG. 3.

Blade tips 24 lie slightly radially beyond the outer radial tips of brush bristles 44. This helps protect brush bristles 44 and permits blades 14 to extend down somewhat further into the turf than brushes 40 to prevent brushes 40 from being too aggressive. However, the outer radial tips of brush bristles 44 could lie even with or radially outside of blade tips 24 if so desired.

When grooming reel 10 is rotated from cutting reel 8 by a belt drive (not shown) as is typical of grass groomers 2, brushes 40 will obviously rotate with blades 14—brushes 40 and blades 14 are integrated together into a single rotary unit. One brush 40 will lie in advance of each tooth 20 of grooming reel 10. However, unlike teeth 20, brush 40 extends substantially continuously along the length of each blade tip flight 32, i.e. brush 40 also extends across and fills in the gaps or areas between adjacent blades 14. Thus, brush 40 ruffles the grass immediately in front of the oncoming teeth 20 in each blade tip flight 32 to help stand the grass and thatch up, even in the areas between adjacent blades 14. Consequently, when teeth 20 arrive to cut and pull up horizontal growth and thatch, the teeth 20 are effective to cut and pull up more of this growth and thatch from the areas between adjacent blades 14. Thus, the addition of brushes 40 to grass groomer 2 produces a more effective turf grooming action.

In addition, if the turf being groomed is wet or damp, even from the morning dew, brushes 40 will brush or sweep away much of this moisture prior to the grass being acted upon by grooming reel 10 or cutting reel 8. This is desirable in reducing the clumping of grass clippings that can occur when the turf being groomed and cut is damp to improve clipping dispersion. In fact, when the turf is covered with dew or moisture, it has sometimes been the practice prior to cutting the grass to try and reduce the inevitable clumping of clippings by wiping away the dew from the grass using a hose, rope or the like which is dragged over the top of the grass prior to mower 4 passing over the turf. This separate, time-consuming and labor intensive dew removal operation is not required with grass groomer 2 of this invention since the integrated brushes 40 do the same thing during operation of grass groomer 2 and mower 4.

Moreover, even if the turf being groomed is dry, the sweeping action provided by brushes 40 opens up the canopy of the grass. This allows the grass clippings to better disappear into the canopy for dispersion and recycling when a basket is not being used on mower 4 to collect the clippings. If a basket is being used and the grass clippings are being collected, brushes 40 help flick the clippings into the basket. As noted earlier, when brushes 40 extend across the length of grooming reel 10, they provide full width turf maintenance as opposed to the narrow spaced areas previously acted on only by blades 14.

Various modifications of this invention will be apparent to those skilled in the art. For example, while it is preferred to have a helical brush 40 in advance of each helical blade tip flight 32, some helical brushes 40 could be deleted as long as grooming reel 10 has at least one such brush 40. In addition, blade tips flights 32 and brushes 40 need not be helical as shown herein, but could be straight across the length of shaft 12. Other ways of attaching brushes 40 to grooming reel 10 could be used.

Furthermore, brushes 40 could comprise small laterally extending sections across the length of grooming reel 10 with such sections being separated from one another to form a non-continuous flight of brush bristles. For example, each spacer 16 could be indexed on shaft 12 and could carry a bristle section affixed thereto (or a plurality of bristle sections affixed thereto around the circumference of spacer 16). In this case, brushes 40 would not extend in front of blade teeth 20, but would extend only in the gaps or spaces between adjacent blades 14. Such individual bristle sections could be helically or linearly aligned with one another from one spacer to the next to, in effect, form a transverse flight of non-continuous brush bristles, but this also need not be the case. Separate bristle sections need not be aligned with one another to form a brush. Thus, the scope of this invention is to be limited only by the appended claims.

I claim:

1. A grass groomer for use on a reel cutting unit of a mower, the reel cutting unit having a cutting reel and a bedknife for cutting grass, the grass groomer being used on the reel cutting unit in advance of the cutting reel with reference to a forward direction of movement of the mower to groom turf having an upper layer of grass, which comprises:
 (a) a grooming reel having a plurality of laterally spaced, toothed blades, wherein the grooming reel is mountable on the reel cutting unit for rotation about a substantially horizontal axis thereon, wherein each blade has at least one tooth that ends in a tip with the tips of the respective blades defining a blade tip orbit as the grooming reel rotates, wherein the blade tips are exposed to the grass at and for at least an arc to either side of a lowermost point of the blade tip orbit to allow the blades to engage into the grassy layer of the turf and to groom the turf by cutting horizontal grass growth and by pulling up thatch during rotation of the grooming reel, and wherein the blade tips form at least one flight of laterally spaced blade tips extending laterally across the grooming reel;
 (b) at least one grass engaging brush that is fixed to the grooming reel to rotate with the grooming reel, wherein the brush comprises a flight of brush bristles extending laterally across the grooming reel; and
 (c) wherein the blade tip flight and the brush bristle flight wind helically around the grooming reel as the blade tip flight and the brush bristle flight extend laterally on the grooming reel.

2. The grass groomer of claim 1, wherein the blade tip flight and the brush bristle flight extend laterally across the grooming reel about the same distance from side-to-side.

3. The grass groomer of claim 1, wherein the blade tip flight and the brush bristle flight are parallel to and circumferentially spaced from one another.

4. The grass groomer of claim 1, further including a plurality of circumferentially spaced blade tip flights on the grooming reel having a flight of brush bristles located between at least one pair of adjacent blade tip flights.

5. The grass groomer of claim 4, further including a plurality of flights of brush bristles with one brush bristle flight being located circumferentially between adjacent blade tip flights.

6. The grass groomer of claim 1, wherein the brush comprises bristles arranged in a continuous flight of brush bristles extending across the length of the grooming reel.

7. A grass groomer for use on a reel cutting unit of a mower, the reel cutting unit having a cutting, reel and a bedknife for cutting grass, the grass groomer being used on the reel cutting unit in advance of the cutting reel with reference to a forward direction of movement of the mower to groom turf having an upper layer of grass, which comprises:
 (a) a grooming reel having a plurality of laterally spaced, toothed blades, wherein the grooming reel is mountable on the reel cutting unit for rotation about a substantially horizontal axis thereon, wherein each blade has at least one tooth that ends in a tip with the tips of the respective blades defining a blade tip orbit as the grooming reel rotates, and wherein the blade tips are exposed to the grass at and for at least an arc to either side of a lowermost point of the blade tip orbit to allow the blades to engage into the grassy layer of the turf and to groom the turf by cutting horizontal grass growth and by pulling up thatch during rotation of the grooming reel;
 (b) at least one grass engaging brush that is fixed to the grooming reel to rotate with the grooming reel; and
 (c) wherein the brush is removable and replaceable from the grooming reel, and wherein the brush is secured to the grooming reel by at least one flexible tie that ties the brush to the grooming reel.

8. A grass groomer for use on a reel cutting unit of a mower, the reel cutting unit having a cutting reel and a bedknife for cutting grass, the grass groomer being used on the reel cutting unit in advance of the cutting reel with reference to a forward direction of movement of the mower to groom turf having an upper layer of grass, which comprises:
 (a) a grooming reel comprising a plurality of laterally spaced blades each of which has a plurality of generally radial, circumferentially spaced teeth, wherein the blade teeth each have a leading edge, a blade tip, and a trailing edge taken with reference to a direction of rotation of the grooming reel, wherein the teeth are adapted to groom the turf as the reel cutting unit passes over the turf and the grooming reel is rotated;
 (b) wherein each blade has at least one radially outwardly facing seat located thereon between the leading edge of one tooth and the trailing edge of a preceding adjacent tooth, wherein each seat comprises a recess having a bottom and opposed sides thereof;
 (c) a brush comprising a base for holding brush bristles, the base of the brush being sized to be received within the seat recesses with the base being supported atop the seat bottoms and with the base further being received between the opposed seat sides, wherein the base of the brush is simultaneously received within the seats in a plurality of the blades such that the brush has a length that is long enough to span across a plurality of the laterally spaced blades forming the grooming reel, and wherein the brush bristles extend radially outwardly between the leading and trailing teeth edges that are on either side of the blade seats in which the base is received; and
 (c) wherein the brush bristles of the brush have tips that do not radially extend beyond the blade tips.

9. The grass groomer of claim 8, wherein each blade has a plurality of radially outwardly facing and circumferentially spaced seats located thereon between the leading and trailing edges of adjacent circumferentially spaced teeth, and further including a plurality of the brushes received in the plurality of seats.

10. The grass groomer of claim 9, wherein the brushes are equal in number to the teeth on each blade.

11. The grass groomer of claim 9, wherein the blade tips of the teeth on the blade, the seats located between adjacent teeth on the blade, and the brushes are helically disposed along a length of the grooming reel.

12. The grass groomer of claim 8, wherein the brushes are substantially coextensive in length with a length of the grooming reel.

13. The grass groomer of claim 8, wherein the blades of the grooming reel form part of a rotary body that includes spacers between adjacent blades, and wherein the base of the brush is secured to the rotary body by being clamped against at least one spacer.

14. The grass groomer of claim 13, wherein the base of the brush is clamped against at least one spacer by at least one cinchable tie that passes over the base of the brush and around the spacer and is cinched tight to hold the base of the brush against the spacer.

15. The grass groomer of claim 14, wherein the brush bristles are removed in the area of the base that is to be occupied by the tie.

16. The grass groomer of claim 14, wherein a plurality of ties are used at spaced locations along a length of the brush.

17. A grass groomer for a reel cutting unit of a mower to groom turf having an upper layer of grass, which comprises:
 (a) a grooming reel that rotates about a substantially horizontal axis;
 (b) wherein the grooming reel has a plurality of helical blade tip flights with the blade tips in each flight acting sufficiently against the turf to cut horizontal grass runners and to dethatch the turf, wherein the helical blade tip flights are spaced from one another around a circumference of the grooming reel; and
 (c) wherein the grooming reel also carries a plurality of helical brushes that are also spaced from one another around the circumference of the grooming reel with the helical brushes being disposed between the helical blade tip flights, and wherein the helical brushes are disposed to rotate with the grooming grass and to ruffle and wipe the grass on the turf simultaneously with the rotation of the grooming reel.

\* \* \* \* \*